Figure 1:
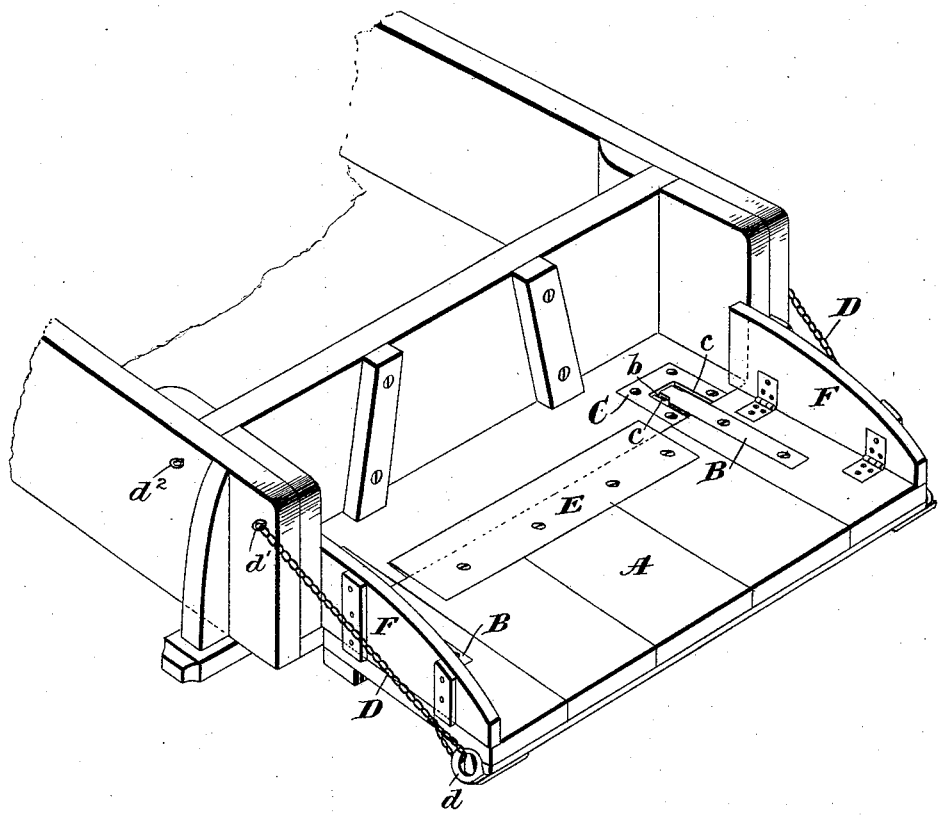

(No Model.) 2 Sheets—Sheet 1.
J. BUTLER.
WAGON END GATE.

No. 477,988. Patented June 28, 1892.

Witnesses:
Jas. E. Hutchinson
Henry C. Hazard

Inventor.
James Butler, by
Rindle & Russell his Attys (No Model.) 2 Sheets—Sheet 2.
J. BUTLER.
WAGON END GATE.
No. 477,988. Patented June 28, 1892.
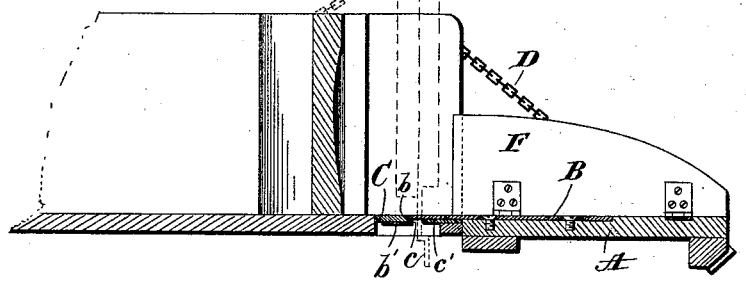
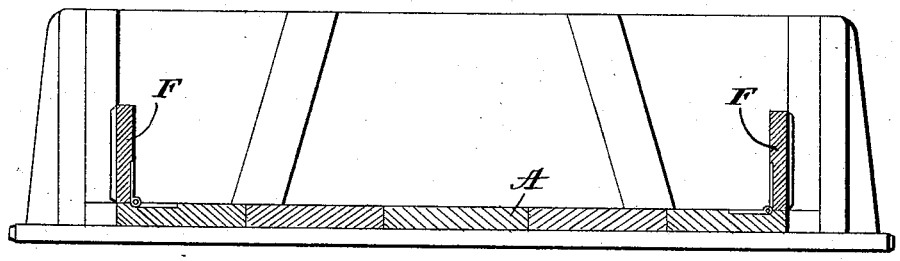
Witnesses:
Jas. E. Hutchinson.
Henry C. Hazard.
Inventor:
James Butler, by
Prindle and Russell, his Attys

UNITED STATES PATENT OFFICE.

JAMES BUTLER, OF GREENWICH, NEW JERSEY.

WAGON END-GATE.

SPECIFICATION forming part of Letters Patent No. 477,988, dated June 28, 1892.

Application filed August 28, 1891. Serial No. 403,965. (No model.)

*To all whom it may concern:*

Be it known that I, JAMES BUTLER, a citizen of the United States, residing at Greenwich, in the county of Cumberland, and in the State of New Jersey, have invented certain new and useful Improvements in Platforms or Extensions for Wagons; and I do hereby declare that the following is a full, clear, and exact description thereof, reference being had to the accompanying drawings, in which—

Figure 1 is a perspective view of the tail end of a wagon equipped with my extension or platform, the same being shown in position for use; Fig. 2, a longitudinal section taken on a line passing through one of the attaching devices, the dotted lines showing the position of parts when the device is not in use; and Fig. 3 is a transverse section.

Letters of like name and kind refer to like parts in the several figures.

In the use of the farm or box wagon for the transportation or haulage of material—such as corn or other grain, &c., which can be removed or unloaded by shoveling—considerable inconvenience is encountered, owing to the fact that the vertically-sliding end-gate with which these wagons are provided is placed so near the end of the body that if the wagon be full there is not only not room enough for a man to stand while shoveling, aside from the inconvenience of working over the gate, but should the gate be removed some of the material would fall over and cover such space as might be outside the gate and in part be precipitated to the ground.

To obviate the above-stated disadvantages attendant upon the use of the farm or box wagon as ordinarily constructed is the object of my invention; and to this end said invention consists in a platform adapted to form a continuation or extension of the floor or bottom of a wagon-box, substantially as and for the purpose hereinafter specified.

In the drawings I show the rear portion of the body of a farm or box wagon having a vertically-sliding end-gate of the usual construction, and, as usual, arranged or located a few inches from the end of the body. Extending rearward from and in the same plane as the bottom of the latter is my platform or extension A to afford a place or support for a man to stand while shoveling out the contents of the wagon. In width I propose to make it one-third greater than the height of the side-boards of the body, which will give a space amply sufficient to afford working room even after the end-gate is removed, and there is a consequent falling rearward of the contents of the wagon toward and upon it. I do not of course limit myself to this or to any particular width; but it should be such that the whole of the surface will not be covered when the material falls rearward when the gate is removed, and so the material be trampled under foot by the workman. In length it should be just equal to the space between the inner faces of the side-boards to enable it to be placed in a vertical position between the latter, out of the way when not in use, as shown by dotted lines, Fig. 2.

To secure or attach the platform to the wagon, I provide, near each side on its upper face, a bar B, having a portion extending beyond its edge, which near its outer end is bent downward at $b$ a short distance and then continued in a horizontal plane, and which is adapted to engage a plate C, secured to the upper side of the wagon-bottom at its rear edge. Said plate has at its center a square hole or opening registering with a longer opening in the bottom, through which the portion $b'$ of the bar B beyond the downwardly-extending part $b$ can be passed or inserted. When inserted therein and brought to a horizontal position, the portion $b'$ of the bar will engage the under side of the plate C in advance of the hole $c$, while the part that is in the higher plane will rest upon the upper side of said plate in rear of said hole, and the portion $b$ will occupy the latter and by engagement with its walls prevent horizontal displacement. The platform may thus be securely attached to and supported by the bottom of the wagon by means which when it is in a horizontal position will prevent downward movement, although permitting, when desired, of its being raised, as on a hinge, into a vertical position, as before indicated and, if preferred, its entire removal from the wagon, when not to be used, simply by the disengagement of the free ends of the bars B B from the plates C C. The bars B B and the plates C C are countersunk in the respective parts to which they are attached, so as to have their surfaces flush with the surfaces of said parts and not project above them, and to avoid projection of that portion of the bar B that engages the upper face of the plate C the latter is provided with a recess or cavity $c$, into which said portion is seated.

To reinforce the attaching means just described, I preferably provide a chain D to extend from an eye or loop $d$, screwed or otherwise fastened to the extreme rear edge of the platform at its corner, to an eye or loop $d'$, secured to the upper rear corner of the side of the wagon-body. This provision of chain and loops is on both sides. The chains D, besides aiding to support the platform when in use, are also used to hold it when raised to a vertical position out of use by being attached to eyes $d^2$, provided on the wagon sides in advance of the eyes $d'$.

In order to insure a smooth level surface for shoveling, I provide on the edge of the platform where it abuts against the edge of the wagon-floor a metal plate E, that projects therefrom a short distance and overlaps and engages the latter, and if, as is frequently the case, the boards forming the bottom are warped or displaced, so that at their rear ends they stand higher than they ought, said boards will be clamped down by said plate against the wagon-bolster and be prevented from offering any impediment to the shovel, as the plane of the surface of the bottom will be the same as that of the platform. The plate E is made of thin material and is countersunk in the latter, so that its upper side will be flush with its surface.

To prevent spilling of the contents of the wagon over the sides of the platform when in use, I provide on each side a hinged leaf or side piece F, adapted to be turned up to occupy a vertical position in line with the inside of the side piece of the wagon so as to form a continuation of the same, and also to be turned down flat against the platform, out of the way, if desired, on discontinuing its use, and either removing it or turning it up into a vertical position, as hereinbefore stated. The inner end of the leaf overlaps and rests against the wagon side when raised to a vertical position, so that no space will be left between them, and also to enable it to be kept or held from being thrown or moved outward from its vertical position. Preferably the height of the leaf is about one-half that of the side of the wagon, and its upper edge is formed on a curved line which gradually approaches its lower edge toward the rear end, so that the height of the leaf rearward is diminished; but of course these details of construction and many others which come within the province of the mechanic may be varied without departure from my invention.

The platform A is preferably constructed of boards arranged so that their grain extends in the direction in which the shovel is moved—that is, the direction of the length of the wagon and not crosswise thereof, so that the shovel will not cut into and be obstructed by the grain.

My platform entirely obviates the difficulty it was designed to overcome. Its means for attachment are such as to enable it to be readily and quickly put in position for use and removed wholly from the wagon, or carried therewith, should this be preferred, out of the way simply by raising it into a vertical position between the side-boards, and in the several details of its construction is complete and advantageous.

Having thus described my invention, what I claim is—

In combination with a wagon-body, a platform adapted to form a continuation of its bottom, attaching devices consisting of two bars fixed to the platform on its upper side and each having portions of its length in two parallel planes, and a plate for each bar provided with an opening and secured to the upper side of the wagon-bottom over an opening within the rear edge thereof, said bars being adapted to engage the under and upper sides of said plate and having portions passing through the openings therein, a chain extending from each side of the wagon to the platform, a lip or plate attached to the platform and overlapping the wagon-bottom, and the hinged pieces at the sides of said platform, substantially as and for the purpose shown.

In testimony that I claim the foregoing I have hereunto set my hand this 14th day of August, 1891.

JAMES BUTLER.

Witnesses:
 WILLIAM B. TRENCHARD,
 ED. R. LANING.